April 28, 1959  G. H. RENZ  2,884,238
MECHANICALLY DRIVEN TACHOMETER INDICATOR
Filed Sept. 7, 1956
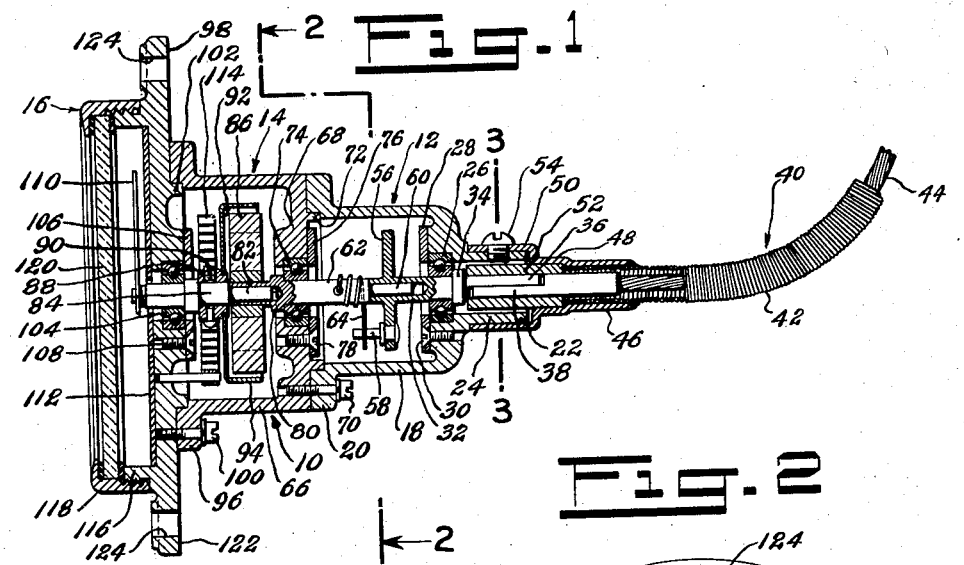
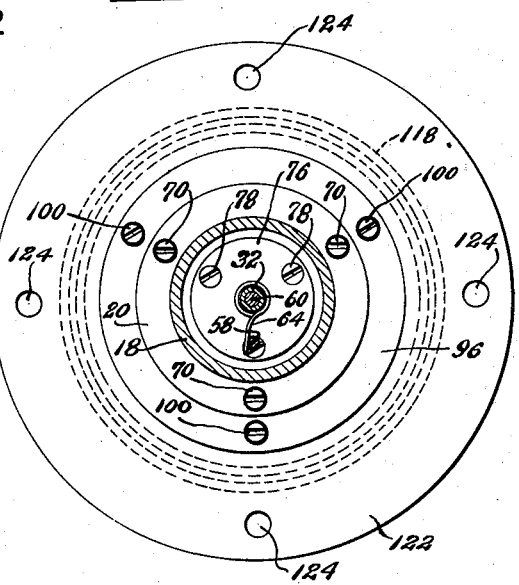
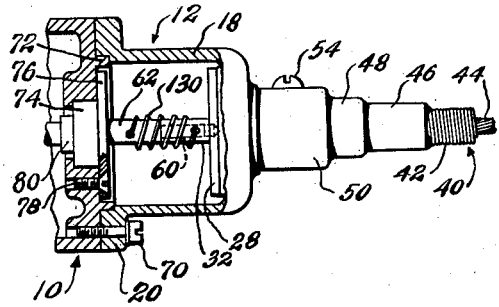
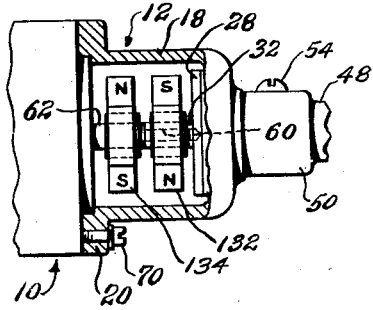
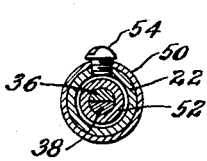
INVENTOR.
GEORGE H. RENZ
BY James J. Cannon
ATTORNEY

United States Patent Office 2,884,238
Patented Apr. 28, 1959

2,884,238

MECHANICALLY DRIVEN TACHOMETER INDICATOR

George H. Renz, Ramsey, N.J.

Application September 7, 1956, Serial No. 608,608

1 Claim. (Cl. 264—13)

My invention relates to tachometers and is directed particularly to tachometers of the type used for indicating the rotational speed of aircraft engines and the like.

Tachometers presently used for indicating engine speed in aircraft involve the use of a tachometer generator device mechanically connected to the engine to be measured for speed interconnected by electrical wiring to a tachometer indicator device at the instrument panel. The tachometer generator provides an electrical signal varying in frequency and/or amplitude as a function of the speed of the engine, which signal is converted by an electrical motor in the tachometer indicator device into mechanical rotation of a shaft. The shaft rotation in turn serves to actuate the speed or r.p.m. indicating needle. Such tachometer devices, because of their complexity, are expensive to manufacture and maintain, as well as being weighty and space consuming.

It is accordingly the principal object of my invention to provide a simplified tachometer system of the character described which eliminates the tachometer generator at the engine and the tachometer driven motor at the indicating instrument and which allows the use instead of a flexible mechanical connection for transmitting the mechanical rotation of the engine.

It is another object of my invention to provide a mechanically driven tachometer instrument of the character described which smoothly steps into synchronism with the rotational motion of the engine and which operates to smooth out any fluctuations or oscillations which may be caused by "whipping" and the like in the motion-transmitting shaft between the engine and the indicating instrument.

It is still another object of my invention to provide a mechanical tachometer device of the above nature which is compact and light enough so that two like tachometer instruments can be combined in a single casing for use with dual engine aircraft.

The foregoing and other objects, features and advantages of my invention will be apparent from the following description when considered with reference to the appended drawings.

In the drawings, wherein like reference numerals denote corresponding parts throughout the several views, Fig. 1 is a cross-sectional view of a mechanically driven tachometer embodying my invention;

Fig. 2 is a vertical cross-section taken along the line 2—2 of Fig. 1 in the direction of the arrows;

Fig. 3 is a vertical cross-sectional view taken along the line 3—3 of Fig. 1;

Fig. 4 is a partial cross-sectional view illustrating a first modification of the embodiment of the invention shown in Fig. 1; and Fig. 5 is a partial cross-sectional view illustrating a second modification of the invention shown in Fig. 1.

Referring now to Fig. 1, the numeral 10 indicates generally a mechanically driven tachometer embodying my invention, the same comprising a rotation damper portion 12, a drag magnet portion 14 and an indicating face portion 16. The rotation damper portion 12 comprises a cylindrical casing 18 formed at one end with a peripheral flange 20 and at its other end with a central sleeve portion 22 of reduced diameter having an axial bore 24. The bore 24 is recessed at its inner end to provide a seat within which a ball bearing 26 is disposed, said ball bearing being held in place by a retainer ring 28 screwed against the inner surface of casing 18 as by screws 30 (only one shown).

Journalled within the ball bearing 26 is a rotor shaft 32 formed at its outer end with a flange portion 34 which seats against the outer side of the inner race of the ball bearing 26. The shaft is further provided with an outwardly-extending split shaft portion 36 adapted to interfit with a complementary split shaft portion 38 of a flexible mechanical drive structure, such as a "Bowden wire," generally indicated by the reference numeral 40.

The flexible mechanical drive structure 40 comprises a flexible tubular outer casing 42 within which is revolvably disposed a laterally flexible yet torsionally stiff cable 44. Soldered or otherwise secured to the indicator end of the flexible drive structure 40 is a connector sleeve 46 having a first portion of increased diameter 48 and a second portion of further increased diameter 50. Press fitted within the first portion of increased diameter 48 of the connector sleeve 46 is a tubular guide member 52 within which the split shaft portion 38 of the flexible drive structure 40 is rotatably disposed, said shaft portion being fixed to the end of the interior cable 44 for rotation therewith.

The second portion of increased diameter 50 of the connector sleeve 46 is of such size as to slide over the sleeve portion 22 of the casing 18, and is connected with said casing by means of the set screw 54. It will thus be apparent that rotation of the interior cable 44 (which at its other end is mechanically connected at the engine for rotation with the drive shaft thereof) transmits rotational motion through the split shaft portions 36 and 38 confined within the tubular guide member 52 to correspondingly rotate the rotor shaft 32 within the damper portion 12.

As illustrated in Fig. 1, the inner end of the rotor shaft 32 is formed with a drive wheel 56 within which is secured an axially-projecting drive pin 58. The inner end of the rotor shaft 32 is axially drilled for aligned reception therein of a centering pin extension portion 60 of a drag magnet shaft 62. A motion transmitting spring 64 circumjacent the drag magnet shaft 62 has one end secured in an opening in said shaft. The other end of the spring 64 extends outwardly of the shaft 62 and is so disposed as to be contacted by the drive pin 58 when it is rotated by the rotor shaft 32. It is to be understood that the centering pin 60 is rotatable within the central bore of the rotor shaft 32, so that torque is transmitted from said shaft to the drag magnet shaft 62 only through the flexible coupling mechanism comprising the drive pin 58 and the spring 64.

The drag magnet portion 14 of the tachometer 10 comprises a cylindrical housing structure 66 having an outer end wall 68 against which the peripheral flange 20 of the damper portion 12 is secured as by screws 70. An annular shoulder 72 is formed in the end wall 68 for centrally locating the damper portion 12. The end wall 68 is also centrally bored and countersunk to receive a ball bearing 74 within which the drag magnet shaft 62 is journalled, said ball bearing being held in place by a retainer ring 75 held in place against the outer side of end wall 68 by means of screws 78. The drag magnet shaft 62 is formed with a flange portion 80 seated against the inner side of the inner race of the ball bearing 74. The inner end of the shaft 62 is centrally bored to receive the guide pin 82 of an indicator shaft 84. Fixed upon the inner end of the drag magnet shaft 62 is a permanent drag magnet member 86. Fixed upon the inner end of the indicator shaft 84 as by a collar 88 and set screw 90 is a cup-shaped drag disc 92 of non-magnetic material having a peripheral portion 94 spaced from but closely adjacent to the outer peripheral ends of the drag magnet member 86. The drag disc 92 and its shaft 84 will be thus imparted a torque due to eddy currents effected in said disc due to rotation of the magnet member 86.

The cylindrical housing structure 66 of the rotation damper portion 14 is formed at its inner end with a flange 96 fixed against the rear wall 98 of the indicating face portion 16 as by screws 100, said rear wall being provided with an annular shoulder 102 for locating said indicating face portion. Seated within a countersunk central opening within the rear wall 98 is a ball bearing 104 journalling the inner end of the indicator shaft 84, said ball bearing being held in place by means of a retainer ring 106 secured in place by screws 108. The front end of the indicator shaft 84 has friction-held thereon an indicator needle 110 which indicates rotational speed against a calibrated dial 112 disposed against the front of the wall 98 of the indicator face portion 16. A torsion spring 114 serves to normally hold the indicator needle 110 at zero-reading position with respect to the calibrated dial 112.

The front of the indicator face portion 16 is formed with an externally threaded flange 116 adapted to threadedly receive a cover flange 118 for securing in place a dial cover glass 120. The indicator face portion 16 is also formed with a peripheral flange 122 having a number of openings 124 for mounting the unit in place on an instrument panel.

In operation, rotation of the flexible cable 44 by the engine drive shaft turns the drive wheel 56 through its rotor shaft 32. The drive pin 58 abutting the spring 64 serves as a resilient interconnection between the rotor shaft 32 and the drag magnet shaft 62, thereby filtering out any fluctuations in cable rotation caused by "whipping." The drag magnet interconnection between the shaft 62 and the indicator shaft 82, operating against the return force of the spring 114, serves to further filter out any unevenness of rotational speed and also to bring the indicator needle to zero.

The first modification of the invention shown in Fig. 4 differs from the above described embodiment of Fig. 1 only in that instead of utilizing a pin-actuated spring 64 in the instrument drive, the shafts 32 and 62 are loosely interconnected by means of a drive spring 130 (or rubber coupling sleeve, not shown) secured to shafts 32 and 62 as illustrated. In this embodiment of the invention the filtering action of the drag magnet mechanism is relied on principally to smooth out irregularities in speed transmission.

Fig. 5 illustrates a second modification of the invention wherein a drive magnet 132 and a slave magnet 134 are used as the torque-transmitting connection between the shafts 32 and 62. Drive is effected through the lines of force of the magnetic field path between opposite polarity ends of the permanent magnets 132 and 134. The resilient nature of the magnetic field in the interconnected magnetic gaps at the ends of the magnets provides fluctuation-filtering action between the shafts 32 and 62.

One advantage of the improved tachometer embodying my invention resides in its simplicity, compactness and low cost. As a result thereof two or more tachometer units can also be conveniently combined in a single instrument housing.

While I have described only three embodiments of my invention, it will be apparent to those skilled in the art that various changes and modifications may be made therein wtihout departing from the invention. The invention therefore is to be limited only by the terms and spirit of the following claim.

What I claim is:

In a tachometer device, the combination comprising, a first cylindrical housing member having journalling means axially disposed at one end and a peripheral flange at the other end, a damper shaft in said cylindrical housing member and journalled at one end in said journalling means, a second cylindrical housing member having axial journalling means at one end and a peripheral flage at the other end, means releasably securing the peripheral flange of said first housing member to said one end of said second housing member and in coaxial alignment therewith, an axial opening in the inner end of said damper shaft, a drag magnet shaft journalled in the journalling means of second housing member, said drag magnet shaft having a reduced diameter stud portion journalled in said axial opening of said damper shaft, a torsion spring in said first housing member and interconnecting said damper shaft and said drag magnet shaft for resilient mechanical cooperation, a circular indicator dial support plate having central journalling means, means releasably securing the peripheral flange of second housing member to one side of said support plate and in coaxial alignment therewith, an axial opening in the inner end of said drag magnet shaft, an indicator shaft journalled in the journalling means of said support plate and extending into said second housing member, said indicator shaft having a reduced diameter stud portion journalled in said axial opening of said drag magnet shaft, magnetic drag mechanism in said second housing member interconnecting said drag magnet shaft and said indicator shaft, an indicator member fixed to said indicator shaft at the other side of said plate member, and resilient means operative to urge said indicator shaft and said indicator member to a reference position of rotation.

References Cited in the file of this patent

UNITED STATES PATENTS

| | | |
|---|---|---|
| 1,249,189 | Poole | Dec. 4, 1917 |
| 1,613,249 | Seguin | Jan. 4, 1927 |
| 1,684,919 | Keyser | Sept. 18, 1928 |
| 2,245,784 | James | June 17, 1941 |
| 2,327,221 | Schweisthal | Aug. 17, 1943 |
| 2,660,422 | Parker | Nov. 24, 1953 |

FOREIGN PATENTS

| | | |
|---|---|---|
| 223,045 | Great Britain | Oct. 16, 1924 |